(12) United States Patent
Slusarczyk et al.

(10) Patent No.: US 10,746,247 B2
(45) Date of Patent: Aug. 18, 2020

(54) DUAL RIDE DAMPER ASSEMBLY

(71) Applicant: BeijingWest Industries Co., Ltd., Beijing (CN)

(72) Inventors: Pawel Slusarczyk, Cracow (PL); Waldemar Widla, Cracow (PL); Jakub Wrzesinski, Cracow (PL)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 86 days.

(21) Appl. No.: 16/143,405

(22) Filed: Sep. 26, 2018

(65) Prior Publication Data

US 2019/0271371 A1 Sep. 5, 2019

Related U.S. Application Data

(60) Provisional application No. 62/638,802, filed on Mar. 5, 2018.

(51) Int. Cl.
*F16F 9/32* (2006.01)
*F16F 9/19* (2006.01)
(Continued)

(52) U.S. Cl.
CPC ............. *F16F 9/3214* (2013.01); *F16F 9/19* (2013.01); *F16F 9/3228* (2013.01); *F16F 9/34* (2013.01);
(Continued)

(58) Field of Classification Search
CPC .. F16F 9/3214; F16F 9/19; F16F 9/461; F16F 9/469; F16F 9/3228; F16F 9/34; F16F 9/341; B60G 17/08
See application file for complete search history.

(56) References Cited

U.S. PATENT DOCUMENTS 4,723,640 A * 2/1988 Beck .................. B60G 17/08
137/614.2
5,035,306 A 7/1991 Ashiba
(Continued)

FOREIGN PATENT DOCUMENTS

CN 103998815 A 8/2014
CN 104246285 A 12/2014
(Continued)

OTHER PUBLICATIONS

Extended European Search Report dated Aug. 2, 2019 for counterpart European patent application No. EP19159281.5.
(Continued)

*Primary Examiner* — Vishal R Sahni
(74) *Attorney, Agent, or Firm* — William H. Honaker; Dickinson Wright PLLC (57) ABSTRACT

A piston assembly for a damper includes a main piston disposed on a center axis. A piston rod is attached to the main piston. A regulator extends between the piston rod and the main piston defining a compartment. The regulator has at least one first aperture and at least one second aperture. A restrictor divides the compartment into a first and second portion. An actuator having a core is disposed in the first portion movable between an opened and a closed position. The restrictor includes a sleeve disposed in the compartment and attached to the regulator. The sleeve defines a hole in fluid communication with the first and second portions and flares outwardly in the first portion toward the regulator to define a slanted edge extending at an oblique angle relative to the center axis to allow the working fluid to flow smoothly thereby limiting noises generated.

17 Claims, 6 Drawing Sheets

(51) Int. Cl.
*F16F 9/34* (2006.01)
*F16F 9/46* (2006.01)
*B60G 17/08* (2006.01)

(52) U.S. Cl.
CPC ............ *F16F 9/461* (2013.01); *F16F 9/469* (2013.01); *B60G 17/08* (2013.01); *B60G 2202/24* (2013.01); *B60G 2206/41* (2013.01); *B60G 2500/10* (2013.01); *B60G 2800/162* (2013.01); *F16F 9/341* (2013.01); *F16F 2228/066* (2013.01)

(56) References Cited

U.S. PATENT DOCUMENTS

| | | | | |
|---|---|---|---|---|
| 5,168,965 | A * | 12/1992 | Huang | F16F 9/46 188/282.2 |
| 6,202,805 | B1 | 3/2001 | Okada et al. | |
| 7,156,214 | B2 * | 1/2007 | Pradel | F16F 9/466 188/300 |
| 9,500,253 | B2 * | 11/2016 | Goldasz | F16F 9/3485 |
| 10,393,210 | B2 * | 8/2019 | Knapczyk | F16F 9/348 |
| 2012/0145496 | A1 * | 6/2012 | Goetz | F16F 9/464 188/282.1 |
| 2016/0288865 | A1 * | 10/2016 | Murakami | B62K 25/08 |
| 2018/0142756 | A1 | 5/2018 | Knapczyk et al. | |

FOREIGN PATENT DOCUMENTS

| | | |
|---|---|---|
| CN | 105051400 A | 11/2015 |
| CN | 105593564 A | 5/2016 |
| CN | 105864346 A | 8/2016 |
| CN | 106979271 A | 7/2017 |
| CN | 107975560 A | 5/2018 |
| DE | 102009038818 A1 | 3/2011 |
| DE | 102014214654 A1 | 1/2016 |
| DE | 102016220722 A1 | 4/2018 |
| WO | 2017/090492 A1 | 8/2018 |

OTHER PUBLICATIONS

First Office Action and search report dated Apr. 29, 2020 for counterpart Chinese patent application No. 201910159176.4, along with machine EN translation downloaded from EPO.

* cited by examiner

DUAL RIDE DAMPER ASSEMBLY

CROSS REFERENCE TO RELATED APPLICATION

This application claims the benefit of U.S. provisional application Ser. No. 62/638,802 filed on Mar. 5, 2018, the entire disclosure of which is incorporated herein by reference in its entirety.

BACKGROUND OF THE INVENTION

1. Field of the Invention

The present invention generally relates to a damper for a vehicle. More particularly, the present invention relates to a piston assembly for use in a damper.

2. Description of the Prior Art

Currently, there is a new field of demand in the automotive suspension area in addition to active and semi-active dampers. There exists a demand for dampers that are operable in either of two different stiffness settings (soft & firm). The two different stiffness settings are also known as "comfort mode" and "sport mode," respectfully.

One such a piston assembly is disclosed in U.S. Pat. No. 7,156,214. The piston assembly includes a main piston disposed on a center axis. A piston rod disposed on the center axis and attached to the main piston. A regulator is attached to the piston rod and defines a compartment to receive the main piston. The regulator connects the main piston with the piston rod for movement between a compression stroke and a rebound stroke. The regulator defines a plurality of apertures including at least one first aperture and at least one second aperture spaced from one another to allow the working fluid to flow through the compartment and the main piston. A restrictor is disposed in the compartment dividing the compartment into a first portion and a second portion for limiting the flow of the working fluid between the first portion and the second portion. An actuator having a core is disposed in the first portion and movable in the first portion.

SUMMARY OF THE INVENTION

A piston assembly constructed in accordance with the present invention provides reduce mass and oil flow restrictions in both compression and rebound strokes. In addition, the piston assembly constructed in accordance with the present invention provides for improved noise reduction.

A piston assembly includes a main piston disposed on a center axis. A piston rod is disposed on the center axis and attached to the main piston. A regulator is attached to the piston rod and defines a compartment to receive the main piston. The regulator connects the main piston with the piston rod for movement between a compression stroke and a rebound stroke. The regulator defines a plurality of apertures including at least one first aperture and at least one second aperture spaced from one another to allow the working fluid to flow through the compartment and the main piston. A restrictor is disposed in the compartment dividing the compartment into a first portion and a second portion for limiting the flow of the working fluid between the first portion and the second portion. An actuator having a core is disposed in the first portion and movable between an opened position and a closed position. While in the opened position, the actuator allows the working fluid to flow through the first aperture, the first portion, the second portion, and the main piston. In the closed position, the actuator prevents the working fluid from flowing through the first apertures and the first portion and allows the working fluid to flow through the second aperture, the second portion, and the main piston. The restrictor having a sleeve disposed in the compartment spaced from the core and attached to the regulator. The sleeve defines a hole disposed in fluid communication with the first portion and the second portion of the compartment. The hole extends along the center axis and flares outwardly in the first portion toward the regulator to define a slanted edge extending outwardly from the center axis at an oblique angle relative to the center axis to allow the working fluid to flow smoothly between the first portion and the second portion thereby limiting noises generated.

According to a further aspect, the present invention provides a damper. The damper includes a housing disposed on a center axis extending between an opened end and a closed end and defining a fluid chamber extending therebetweeen for containing a working fluid. A piston assembly including main piston is slidably disposed in the housing dividing the fluid chamber into a compression chamber and a rebound chamber. The compression chamber extends between the closed end and the main piston. The rebound chamber extends between the opened end and the main piston. A piston rod is disposed on the center axis and attached to the main piston. A regulator extends between the piston rod and the main piston connecting the main piston with the piston rod for movement between a compression stroke and a rebound stroke. The regulator defines a compartment disposed in fluid communication with the fluid chamber to receive the main piston. The regulator defines a plurality of apertures including at least one first aperture and at least one second aperture, spaced from one another, to allow the working fluid to flow through the compartment and the main piston. A restrictor is disposed in the compartment dividing the compartment into a first portion and a second portion for limiting the flow of the working fluid between the first portion and the second portion. An actuator having a core is disposed in the first portion and movable between an opened position and a closed position. In the opened position, the actuator allows the working fluid to flow through the first aperture, the first portion and the second portion, and the main piston. In the closed position, the actuator prevents working fluid from flowing through the first apertures and the first portion of the compartment and allowing the working fluid to flow through the second aperture, the second portion, and the main piston. The restrictor having a sleeve disposed in the compartment spaced from the core and attached to the regulator. The sleeve defines a hole disposed in fluid communication with the first portion and the second portion of the compartment. The hole extends along the center axis and flares outwardly in the first portion toward the regulator to define a slanted edge extending outwardly from the center axis at an oblique angle relative to the center axis to allow the working fluid to flow smoothly between the first portion and the second portion thereby limiting noises generated.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, it is one aspect of the present invention to provide a piston assembly 20 for a damper 22.

Figure 1:
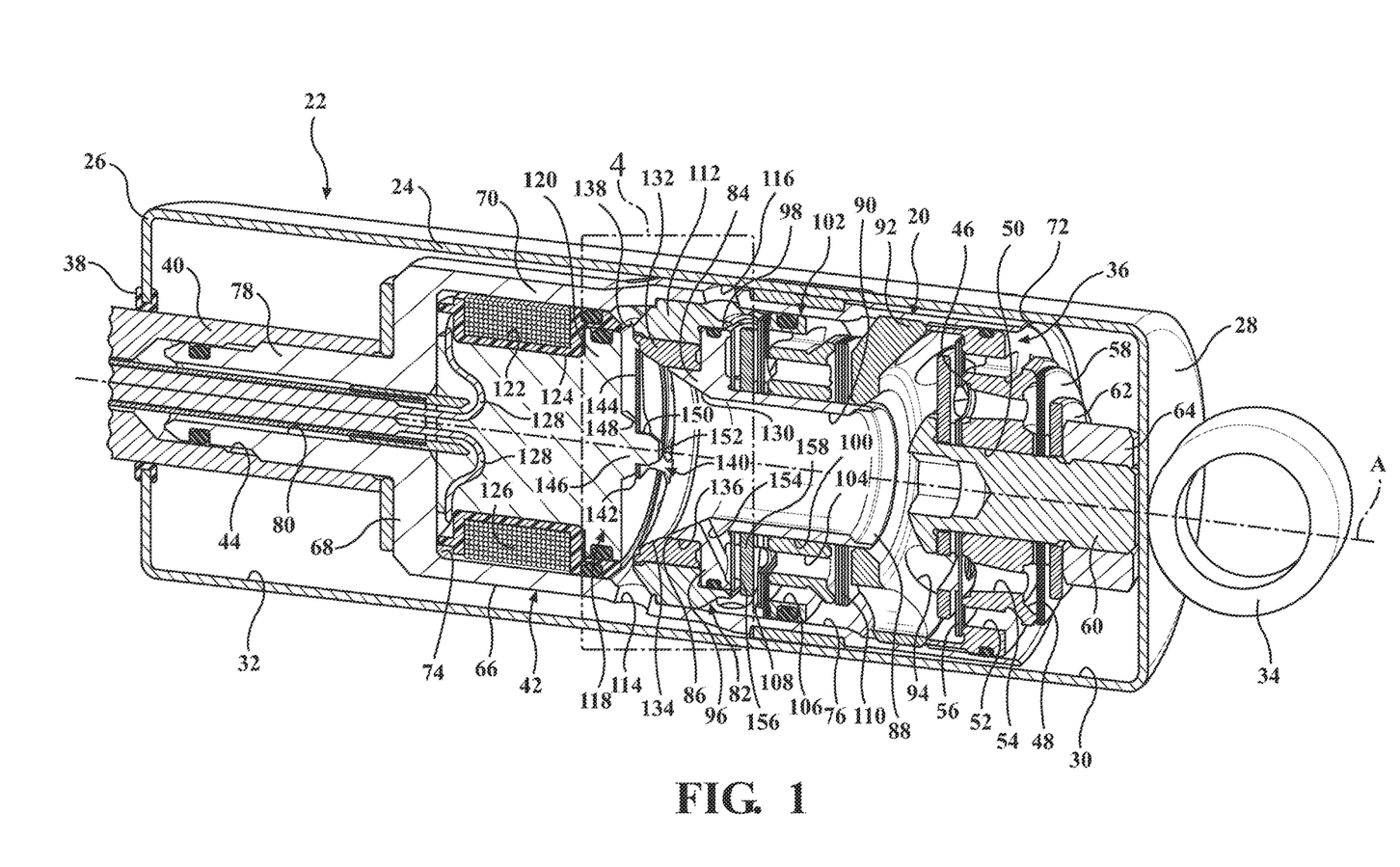
FIG. 1 is a cross-sectional perspective view of the piston damper assembly being disposed in a damper.

The damper 22, as generally shown in FIG. 1, includes a housing 24, having a generally cylindrical shape, is disposed on a center axis A extending between an opened end 26 and a closed end 28 and defines a fluid chamber 30, 32, having a generally cylindrical shape, extending therebetween along the center axis A for containing a working fluid. A ring 34, having a generally circular shape, is attached to the closed end 28 of the housing 24 for attaching the housing 24 to a vehicle.

The piston assembly 20 is disposed the fluid chamber 30, 32 dividing the fluid chamber 30, 32 into a compression chamber 30 and a rebound chamber 32. The piston assembly 20 includes a main piston 36, having a generally cylindrical shape, slidably disposed in the housing 24 dividing the fluid chamber 30, 32 into the compression chamber 30 extending between the closed end 28 and the main piston 36 and the rebound chamber 32 between the opened end 26 and the main piston 36.

A rod guide 38 is disposed in the rebound chamber 32 and attached to the opened end 26 of the housing 24 to close the fluid chamber 30, 32. A piston rod 40 is disposed on the center axis A and extends along the center axis A through the rod guide 38 into the rebound chamber 32 to a distal end spaced from the main piston 36. A regulator 42 extends between the distal end of the piston rod 40 and the main piston 36 connecting the main piston 36 with the piston rod 40 to allow the piston rod 40 to move the main piston 36 between a compression stroke and a rebound stroke. The compression stroke is defined as the piston rod 40, the regulator 42, and the main piston 36 moving toward the closed end 28. The rebound stroke is defined as the piston rod 40, the regulator 42, and the main piston 36 moving toward the opened end 26. The piston rod 40 defines a channel 44, having a generally cylindrical shape, extending from the distal end of the piston rod 40 toward the rod guide 38 to receive the regulator 42.

The main piston 36 includes a compression surface 46 and a rebound surface 48. The compression surface 46, having a generally circular shape, is disposed in the rebound chamber 32 facing the rod guide 38. The rebound surface 48, having a generally circular shape, is disposed in the compression chamber 30 facing the closed end 28. The main piston 36 defines a bore 50, having a generally cylindrical shape, extending along the center axis A between the compression surface 46 and the rebound surface 48. The main piston 36 also includes a plurality of passages 52, 54 including at least one compression passage 52 and at least one rebound passage 54. The at least one rebound passage 54 is radially spaced from the bore 50 and extends between the compression surface 46 and the rebound surface 48 for allowing the working fluid to flow through the main piston 36 during the rebound stroke. The at least one compression passage 52 is radially spaced from the at least one rebound passage 54 and extends between the compression surface 46 and the rebound surface 48 for allowing the working fluid to flow through the main piston 36 during the compression stroke. A compression valve 56, having at least one disc and having a generally circular shape, is disposed on the compression surface 46 of the main piston 36 covering the compression passages 52, 54 to limit the flow of the working fluid through the main piston 36 during the compression stroke. A rebound valve 58, having at least one disc and having a generally circular shape, is disposed on the rebound surface 48 of the main piston 36 covering the rebound passages 52, 54 for limiting the flow of the working fluid through the main piston 36 during the rebound stroke.

The main piston 36 includes a pin 60, having a generally cylindrical shape, disposed on the center axis A. The pin 60 extends along the center axis A and through the bore 50, the compression valve 56, and the rebound valve 58. A spacer 62, having a generally circular shape, is disposed adjacent to the rebound valve 58, the pin 60, and extends annularly about the pin 60. A fastener 64 is disposed adjacent to the spacer 62 and threadedly engages the pin 60 to secure the compression valve 56, the rebound valve 58, and the main piston 36. In other words, the fastener 64 and the pin 60 holds the main piston 36, the spacer 62, the rebound valve 58, and the compression valve 56 together.

The regulator 42 includes a body 66, having a generally cylindrical shape, and having a top portion 68, having a generally circular shape, disposed adjacent to the distal end of the piston rod 40, extending annularly about the center axis A and radially outwardly from the center axis A. The body 66 includes a bottom portion 70 extending outwardly from the top portion 68, annularly about the center axis A, to a proximal end 72 defining a compartment 74, 76, having a generally cylindrical shape, extending between the top portion 68 and the promixal end to receive the main piston 36. In other words, the bottom portion 70 extends between the main piston 36 and the piston rod 40 connecting the main piston 36 with the piston rod 40. The body 66 further includes a collar 78, having a generally cylindrical shape, disposed in the channel 44 of the piston rod 40 and extending annularly about the center axis A and outwardly from the top portion 68 of the body 66, abutting the piston rod 40, to secure the body 66 to the piston rod 40. The collar 78 defines a conduit 80, having a generally cylindrical shape, disposed on the center axis A. The conduit 80 extends through the top portion 68 and is in fluid communication with the compartment 74, 76 of the body 66.

A restrictor 82 is disposed in the compartment 74, 76 dividing the compartment 74, 76 into a first portion 74 and a second portion 76. The first portion 74 extends between the top portion 68 of the body 66 and the restrictor 82. The second portion 76 extends between the main piston 36 and the restrictor 82. The restrictor 82 includes a sleeve 84, having a generally tubular shape, disposed in the compartment 74, 76 spaced from the top portion 68 of the body 66 and the main piston 36. The sleeve 84 extends annularly along the center axis A between a primary end 86 and a secondary end 88 wherein the primary end 86 is disposed in the first portion 74 and the secondary end 88 is disposed in the second portion 76. The sleeve 84 defines a hole 90 extending between the primary end 86 and the secondary end 88 to allow fluid communication between the first portion 74 and the second portion 76. A base 92, having a generally circular shape, is disposed at the secondary end 88 of the sleeve 84 and extends annularly about the sleeve 84 between the body 66 and the sleeve 84. The base 92 defines a plurality of slots 94 disposed about the center axis A and circumferentially spaced from one another for allowing the working fluid to flow through the base 92. The sleeve 84 includes a flange 96 disposed in the first portion 74 of the compartment 74, 76, spaced from the primary end 86, and extends annularly outwardly from the sleeve 84 in a perpendicular relationship with to the center axis A to a flange end 98, spaced from the body 66, to define a recess 100 extending annularly about the center axis A between the base 92, the flange 96, and the sleeve 84. The recess 100 is disposed in fluid communication with the first portion 74.

An additional piston 102, having a generally cylindrical shape, is disposed in the recess 100, extending annularly about the sleeve 84, and abuts the bottom portion 70 of the body 66 for limiting the working fluid flow between the first portion 74 and the second portion 76. The additional piston 102 defines a rebound orifice 104 and a compression orifice 106. The rebound orifice 104 is radially spaced from the sleeve 84 and extends through the additional piston 102 and the compression orifice 106 being radially spaced from the rebound orifice 104 and extending through the additional piston 102 for allowing the working fluid to flow through the additional piston 102. At least one compression flow valve 108, including a disc having a circular shape, is disposed in the recess 100 extending annularly about the sleeve 84 between the flange 96 and the additional piston 102. The at least one compression flow valve 108 abuts the additional piston 102 to cover the compression orifice 106 for limiting the flow of the working fluid between the first portion 74 and the second portion 76 in the compression stroke. At least one rebound flow valve 110, including a disc having a circular shape, is disposed in the recess 100 extending annularly about the sleeve 84 between the base 92 and the additional piston 102. The at least one rebound flow valve 110 abuts the additional piston 102 to cover the rebound orifice 104 for limiting the flow of the working fluid between the first portion 74 and the second portion 76 in the rebound stroke.

A partitioning member 112, having a generally circular shape, is disposed in the first portion 74 of the compartment 74, 76 abutting the flange end 98. The partitioning member 112 is spaced from the sleeve 84 and the bottom portion 70 of the body 66 and extends annularly about the flange end 98. The bottom portion 70 of the body 66 defines a plurality of apertures 114, 116 for allowing the working fluid to flow from the fluid chamber 30, 32 into the first portion 74, the second portion 76, and the main piston 36. The plurality of apertures 114, 116 includes at least one first aperture 114 and at least one second aperture 116 with the first aperture 114, having a generally circular shape, disposed about the body 66 and circumferentially spaced from one other adjacent to the partitioning member 112 for allowing the working fluid to flow through the first portion 74, the second portion 76, and the main piston 36. The second aperture 116, having a circular shape, is disposed about the body 66, circumferentially space from one another, in the second portion 76 adjacent to the partitioning member 112 for allowing the working fluid to flow through the additional piston 102, the second portion 76, and the main piston 36.

An actuator 118 is disposed in the first portion 74 and movable between an opened position and a closed position for limiting the fluid flow through the first aperture 114 and the second aperture 116 into the compartment 74, 76. In the opened position, the actuator 118 allows the working fluid to flow through the first apertures 114, the first portion 74, the second portion 76, and the main piston 36. In the closed position, the actuator 118 prevents the working fluid from flowing through the first apertures 114 and allows the working fluid to flow through the second apertures 116, the additional piston 102, the second portion 76, and the main piston 36.

Figures 2, 3:
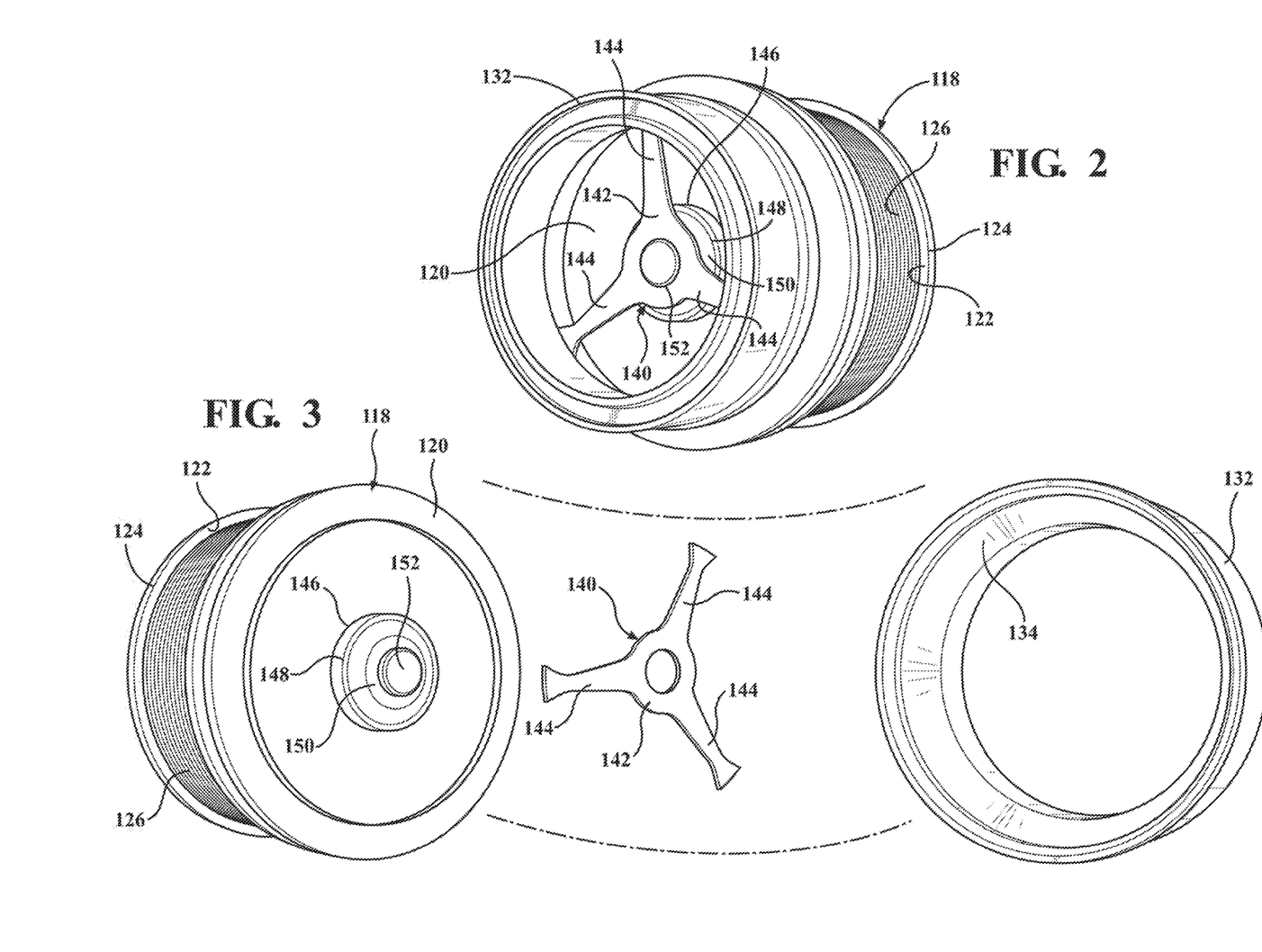
FIG. 2 is a perspective view of the actuator of the piston assembly.
FIG. 3 is an exploded view of the actuator of the piston assembly.

The actuator 118, as best shown in FIGS. 1-3, includes a core 120, having a generally cylindrical shape, disposed in the first portion 74 of the compartment 74, 76 adjacent to the opt portion of the regulator 42. The core 120 defines a trough 122 extending annularly about the core 120. A spool 124 is disposed in the trough 122 and extends annularly about the core 120. A coil 126 is disposed on the spool 124 and extends annularly about the core 120. A cable 128 is disposed on the center axis A and extends through the channel 44 of the piston rod 40 and the conduit 80 of the collar 78. The cable 128 is electrically connected to the coil 126 for providing an electric current to the coil 126 to generate an electromagnetic field.

Figure 5:
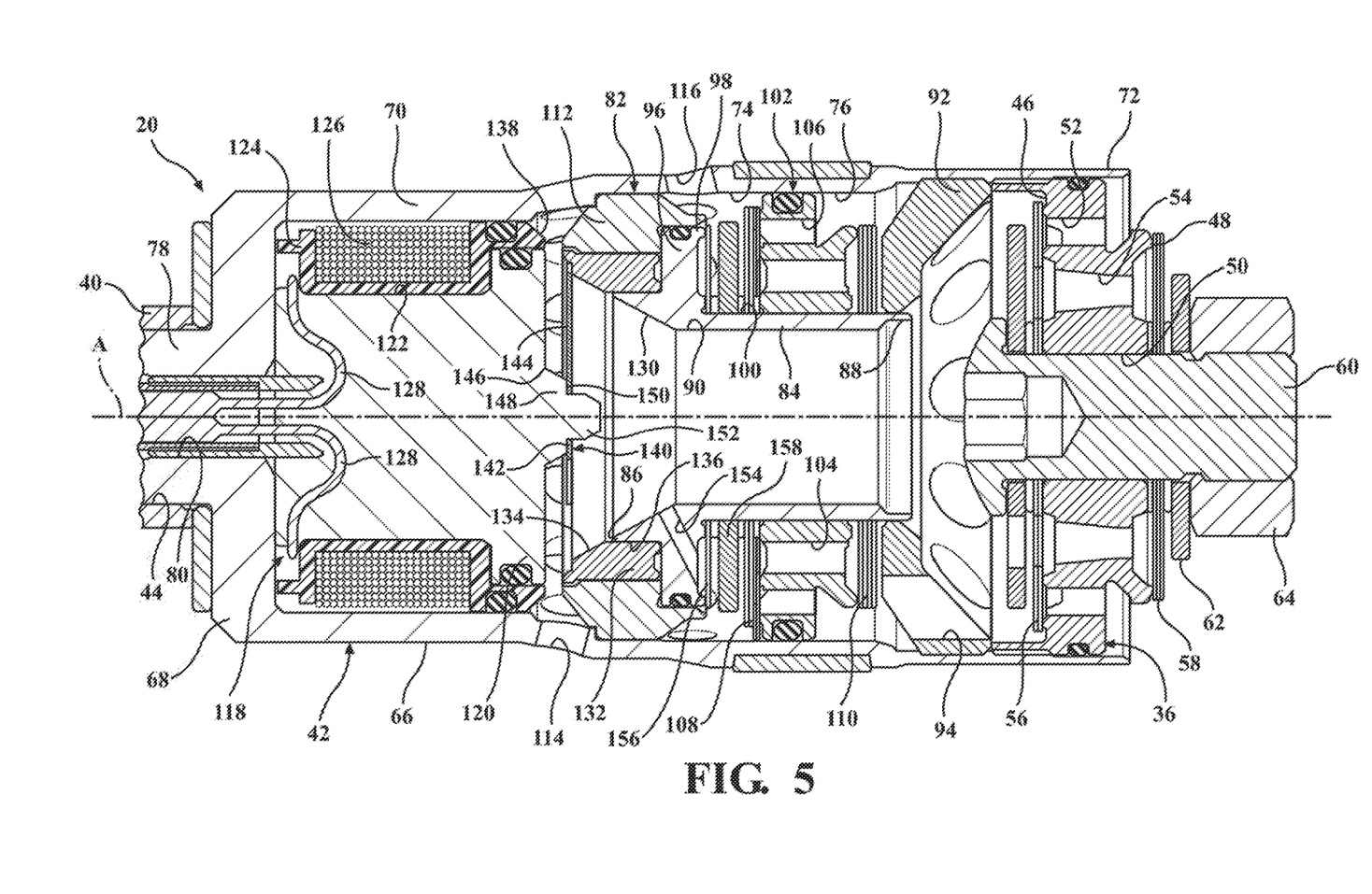
FIG. 5 is an enlarged cross-sectional side view of the piston assembly with the actuator in the opened position.
Figure 6:
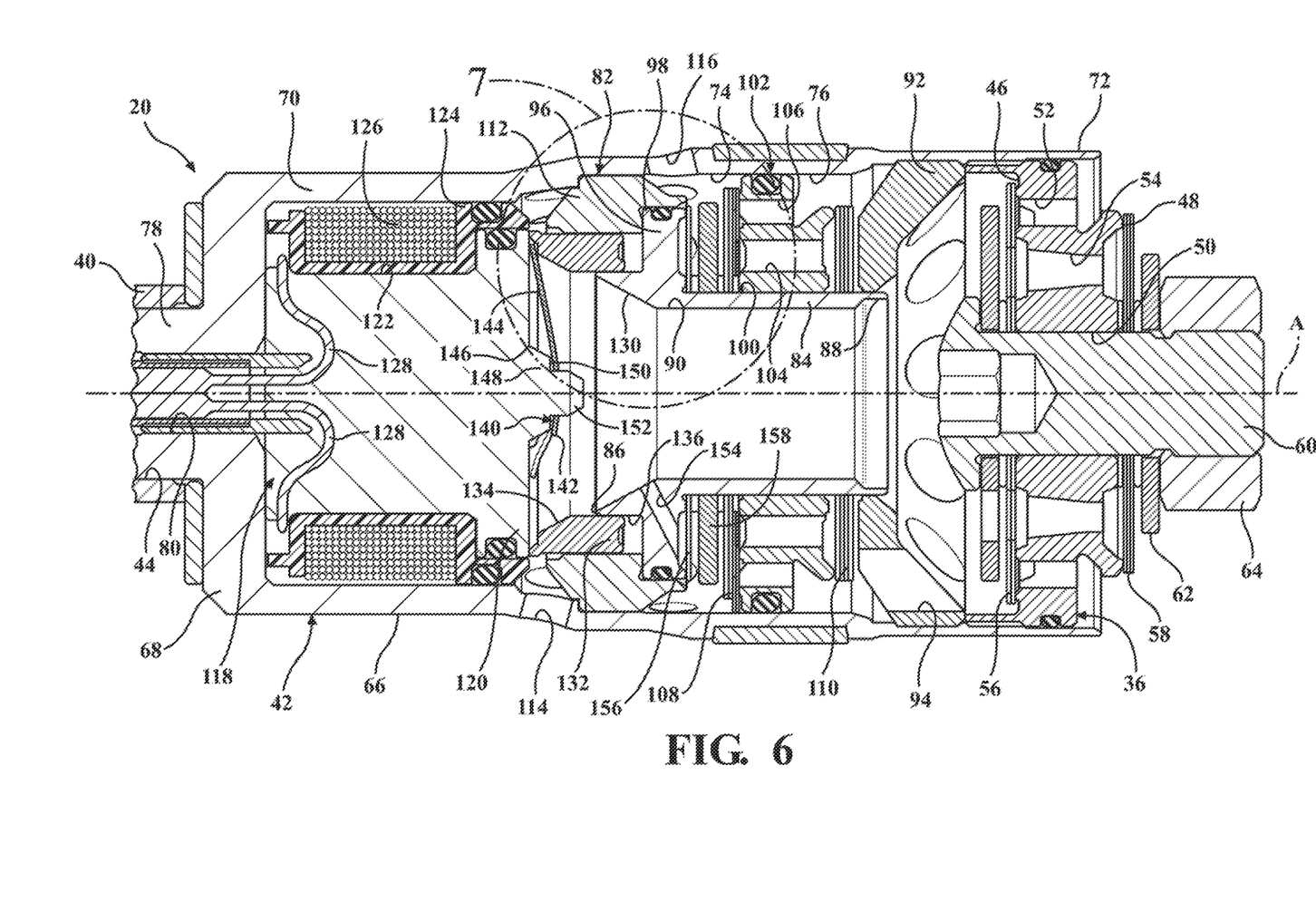
FIG. 6 is an enlarged cross-sectional side view of the piston assembly with the actuator in the closed position.

As best shown in FIGS. 1, 5, and 6, the hole 90 of the sleeve 84 extends along the center axis A and flares outwardly in the first portion 74 toward the regulator 42 to define a slanted edge 130 extending outwardly from the center axis A. The slanted edge 130 extends at an oblique angle relative to the center axis A. Flaring out and angling of the slanted edge 130 provides for the working fluid to flow smoothly between the first portion 74 and the second portion 76. The actuator 118 further includes a plunger 132 disposed between the core 120 and the sleeve 84 of the restrictor 82 and movable along the center axis A between the opened position and the closed position in response to the electromagnetic field generated by the coil 126. It should be appreciated that the plunger 132 can be made from a magnetic material that would enable the plunger 132 to move between the opened position and the closed position. In other words, based on the electromagnetic field generated by the coil 126, the plunger 132 is able to block the working fluid from flowing through the first and second apertures 114, 116. The plunger 132 has an inclined surface 134 being aligned with the slanted edge 130 of the sleeve 84 in the opened position for allowing the working fluid to flow through the first portion 74 of the compartment 74, 76.

The partitioning member 112, the flange 96, and the sleeve 84 define a gap 136, having a generally circular shape, disposed in the first portion 74 of the compartment 74, 76 and extending annularly about the center axis A to receive the plunger 132. When in the opened position, the plunger 132 is disposed in the gap 136 wherein the inclined surface 134 of the plunger 132 and the slanted surface of the sleeve 84 are aligned with one another to define an opening 138 between the core 120 and the sleeve 84 to allow fluid flow through the first aperture 114, the first portion 74, the second portion 76, and the main piston 36. When in the closed position, the plunger 132 moves axially along the center axis A, to be in an abutment relationship with the core 120 to prevent fluid flow through the first aperture 114 and the first portion 74 and allow the working fluid to flow through the second aperture 116, the second portion 76, and the main piston 36. At the same time, as the plunger 132 moves axially toward the core 120, the gap 136 opens up between the partitioning member 112, the flange 96, the sleeve 84, and the plunger 132 allowing the working fluid to fill the gap 136 thereby providing a damping effect to the plunger 132 as the plunger 132 moves from the opened position to the closed position and reduce the noise generated in comparison with a piston assembly 20 without the gap 136.

As shown in FIGS. 2 and 3, an elastic member 140 is disposed between the core 120 and the plunger 132 to bias the plunger 132 in the gap 136 of the sleeve 84 in the opened position. The elastic member 140 includes a mounting member 142, having a generally circular shape, disposed on the center axis A between the plunger 132 and the core 120. The mounting member 142 defines a perforation, having a generally circular shape, disposed on the center axis A. A plurality of three prongs 144 equidistantly spaced from one another and extends radially outwardly from the mounting member 142 to the plunger 132 to bias the plunger 132 in the opened position and returning the plunger 132 from the closed position to the opened position.

Figure 4:
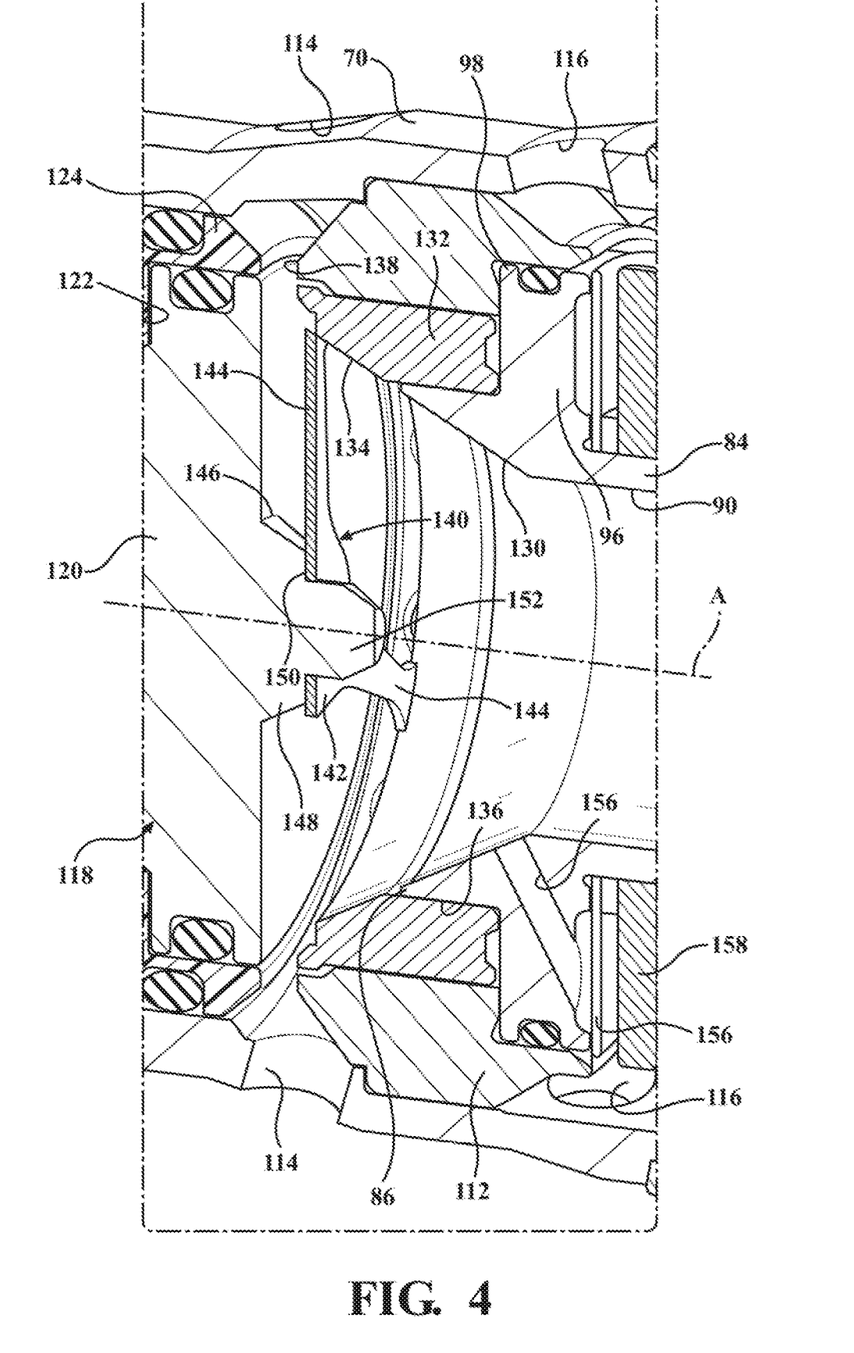
FIG. 4 is an enlarged cross-sectional view of the actuator, the elastic member and the plunger of the piston assembly.

As best shown in FIG. 4, a support 146 is attached to the core 120 to receive the elastic member 140 and spacing the elastic member 140 from the core 120. The support 146 includes a projection 148, having a frusto-conical shaped cross-section, disposed on the center axis A and extending outwardly from the core 120 to a projection end 150. The support 146 further includes a protrusion 152 extending outwardly from the projection end 150 and through the perforation to retain the elastic member 140 on the projection 148 of the support 146 and allow the elastic member 140 to bias against the projection 148 to space the elastic member 140 from the core 120.

The sleeve 84 defines at least one pathway 154 extending through the sleeve 84 and the flange 96 to allow the working fluid to flow through the sleeve 84. An additional flow valve 156, having a generally circular shape, is disposed adjacent and spaced from the at least one compression flow valve 108 to cover the at least one pathway 154 to limit the working fluid from flowing through the at least one pathway 154. A washer 158, having a generally circular shape, is disposed annularly about the sleeve 84 between the additional flow valve 156 and the at least one compression flow valve 108 to bias the additional flow valve 156 against the sleeve 84 and the at least one compression flow valve 108 against the additional piston 102.

Figure 7:
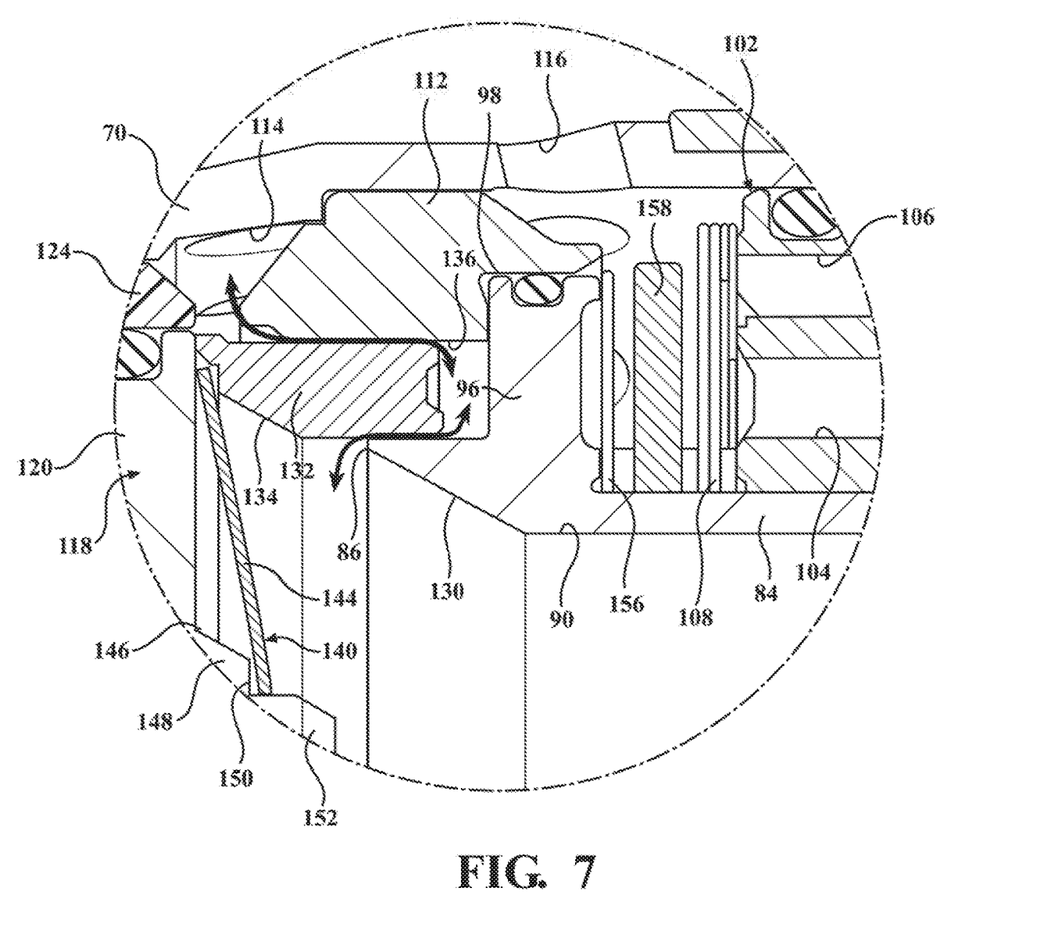
FIG. 7 is an enlarged cross-sectional view of the plunger and the elastic member of the piston assembly in the closed position.

In operation, as the piston assembly 20 moves between the compression stroke and the rebound stroke, the plunger 132 of the actuator 118 is able to move of the piston assembly 20 between the opened position, e.g. a "comfort mode," and a closed position, e.g. a "sport mode." When in the comfort mode, no electric current is sent through the coils 126. As a result, the elastic member 140 biases the plunger 132 in the gap 136 between the flange 96, the partitioning member 112, and the sleeve 84 thereby defining the opening 138 between the plunger 132 and the core 120 allowing the working fluid to flow through the first portion 74, the second portion 76, and the main piston 36. When in the sport mode, the electric current is sent through the coils 126 to energize the coils 126 and generate an electromagnetic field. In response to the electromagnetic field generated by the core 120, the plunger 132 moves axially along the center axis A to abut the core 120 thereby blocking the working fluid from flowing through the first aperture 114 and allow the working fluid to flow through the second aperture 116, the second portion 76, and the main piston 36. As best illustrated in FIG. 7, as the plunger 132 moves axially along the center axis A toward the core 120, the gap 136 between the flange 96, the partitioning member 112, and the sleeve 84 opens up allowing the working fluid to fill up the gap 136. Filling the gap 136 with the working fluid provides a damping force for the plunger 132 as the plunger 132 returns from the closed position to the opened position thereby also minimize or eliminates the noise generated by this movement.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A piston assembly comprising;
    a main piston disposed on a center axis;
    a piston rod disposed on said center axis and attached to said main piston;
    a regulator attached to said piston rod and defining a compartment and connecting said main piston with said piston rod for movement between a compression stroke and a rebound stroke;
    said regulator defining a plurality of apertures including at least one first aperture and at least one second aperture spaced from one another to allow a working fluid to flow through said compartment and said main piston;
    a restrictor disposed in said compartment dividing said compartment into a first portion and a second portion for limiting the flow of the working fluid between said first portion and said second portion;
    an actuator having a core disposed in said first portion for generating an electromagnetic field and said actuator being movable between an opened position and a closed position with said opened position allowing the working fluid to flow through said first aperture and said first portion and said second portion and said main piston and said closed position preventing the working fluid from flowing through said first apertures and said first portion and allowing the working fluid to flow through said second aperture and said second portion and said main piston; and
    said restrictor including a sleeve disposed in said compartment spaced from said core and attached to said regulator and defining a hole disposed in fluid communication with said first portion and said second portion of said compartment and extending along said center axis and flaring outwardly in said first portion toward said regulator to define a slanted edge extending outwardly from said center axis at an oblique angle relative to said center axis to allow the working fluid to flow smoothly between said first portion and said second portion,
    wherein said actuator includes a plunger disposed between said core and said sleeve and movable along said center axis between said opened position and said closed position in response to said electromagnetic field generated by said core, and
    wherein said plunger has an inclined surface disposed in a coplanar relationship with said slanted edge of said sleeve in said opened position.

2. The piston assembly as set forth in claim 1 wherein said sleeve defines a gap for receiving said plunger in said opened position thereby defining said opened position as said plunger being disposed in said gap defining an opening between said core and said sleeve to allow fluid flow through said first aperture and said first portion and said second portion and defining said closed position as said plunger being in an abutment relationship with said core to prevent fluid flow through said first apertures and said first portion and allowing fluid flow through said second aperture and said second portion and said main piston whereby as said plunger moves toward said core said gap is filled with the working fluid to providing a damping force to said plunger as said plunger moves from said closed position to said opened position to reduce noise generated.

3. The piston assembly as set forth in claim 1 further including an elastic member disposed in said first portion of said compartment and attached to said core to bias said plunger against said sleeve in said opened position.

4. The piston assembly as set forth in claim 3 wherein said elastic member includes a mounting member defining a perforation disposed on said center axis attached to said core.

5. The piston assembly as set forth in claim 4 wherein said core includes a support disposed on said center axis and extending outwardly from said core through said perforation to space said elastic member from said core.

6. The piston assembly as set forth in claim 5 wherein said elastic member includes a plurality of three prongs equidistantly spaced from one another and extending radially outwardly from said mounting member to said plunger to bias said plunger in said opened position.

7. The piston assembly as set forth in claim 1 wherein said sleeve defines at least one pathway extending through said slanted edge of said sleeve to allow the working fluid to flow through said sleeve.

8. The piston assembly as set forth in claim 7 further including an additional flow valve disposed about said sleeve and adjacent to said at least one pathway to cover said at least one pathway to limit the working fluid from flowing through said at least one pathway.

9. A damper comprising:
a housing disposed on a center axis extending between an opened end and a closed end and defining a fluid chamber extending therebetweeen for containing a working fluid;
a piston assembly including a main piston slidably disposed in said housing dividing said fluid chamber into a compression chamber between said closed end and said main piston and a rebound chamber between said opened end and said main piston;
a piston rod disposed on said center axis and attached to said main piston;
a regulator attached to said piston rod and defining a compartment in fluid communication with said fluid chamber to receive said main piston and connecting said main piston with said piston rod for movement between a compression stroke and a rebound stroke;
said regulator defining a plurality of apertures including at least one first aperture and at least one second aperture spaced from one another to allow the working fluid to flow through said compartment and said main piston;
a restrictor disposed in said compartment dividing said compartment into a first portion and a second portion for limiting the flow of the working fluid between said first portion and said second portion;
an actuator having a core disposed in said first portion for generating an electromagnetic field and said actuator being movable between an opened position and a closed position with said opened position allowing the working fluid to flow through said first aperture and said first portion and said second portion and said main piston and said closed position preventing the working fluid from flowing through said first aperture and said first portion and allowing the working fluid to flow through said second aperture and said second portion and said main piston; and
said restrictor including a sleeve disposed in said compartment spaced from said core and attached to said regulator and defining a hole disposed in fluid communication with said first portion and said second portion of said compartment and extending along said center axis and flaring outwardly in said first portion toward said regulator to define a slanted edge extending outwardly from said center axis at an oblique angle relative to said center axis to allow the working fluid to flow smoothly between said first portion and said second portion,
wherein said actuator includes a plunger disposed between said core and said sleeve of said restrictor and movable along said center axis between said opened position and said closed position in response to said electromagnetic field generated by said core, and
wherein said plunger has an inclined surface disposed in a coplanar relationship with said slanted edge of said sleeve in said opened position.

10. The damper as set forth in claim 9 wherein said sleeve defines a gap for receiving said plunger in said opened position thereby defining said opened position as said plunger being disposed in said gap defining an opening between said core and said sleeve to allow fluid flow through said first aperture and said first portion and said second portion and defining said closed position as said plunger being in an abutment relationship with said core to prevent fluid flow through said first aperture and said first portion and allowing fluid flow through said second aperture and said second portion and said main piston whereby as said plunger moves toward said core said gap is filled with the working fluid to providing a damping force to said plunger as said plunger moves from said closed position to said opened position to reduce noise generated.

11. The damper as set forth in claim 9 further including an elastic member disposed in said first portion of said compartment and attached to said core to bias said plunger against said sleeve in said opened position.

12. The damper as set forth in claim 11 wherein said elastic member includes a mounting member defining a perforation disposed on said center axis attached to said core.

13. The damper as set forth in claim 12 wherein said core includes a support disposed on said center axis and extending outwardly from said core and attached to said elastic member to space said elastic member from said core.

14. The damper as set forth in claim 13 wherein said support includes a projection disposed on said center axis and extending outwardly from said core to a projection end; and
a protrusion extending outwardly from said projection end and through said perforation to retain said elastic member on said projection and allow said elastic member to bias against said projection to space said elastic member from said core.

15. The damper as set forth in claim 12 wherein said elastic member includes a plurality of three prongs equidistantly spaced from one another and extending radially outwardly from said mounting member to said plunger to bias said plunger in said opened position.

16. The damper as set forth in claim 9 wherein said sleeve defining at least one pathway extending through said slanted edge of said sleeve to allow the working fluid to flow through said sleeve.

17. The damper as set forth in claim 16 further including an additional flow valve disposed about said sleeve and adjacent to said at least one pathway to cover said at least one pathway to limit the working fluid from flowing through said at least one pathway.

\* \* \* \* \*